July 2, 1929. J. H. HERZER 1,719,055
COMBINATION BUMPER, CONTAINER, TENT, AND CAR COVER
Filed April 20, 1927 2 Sheets-Sheet 1
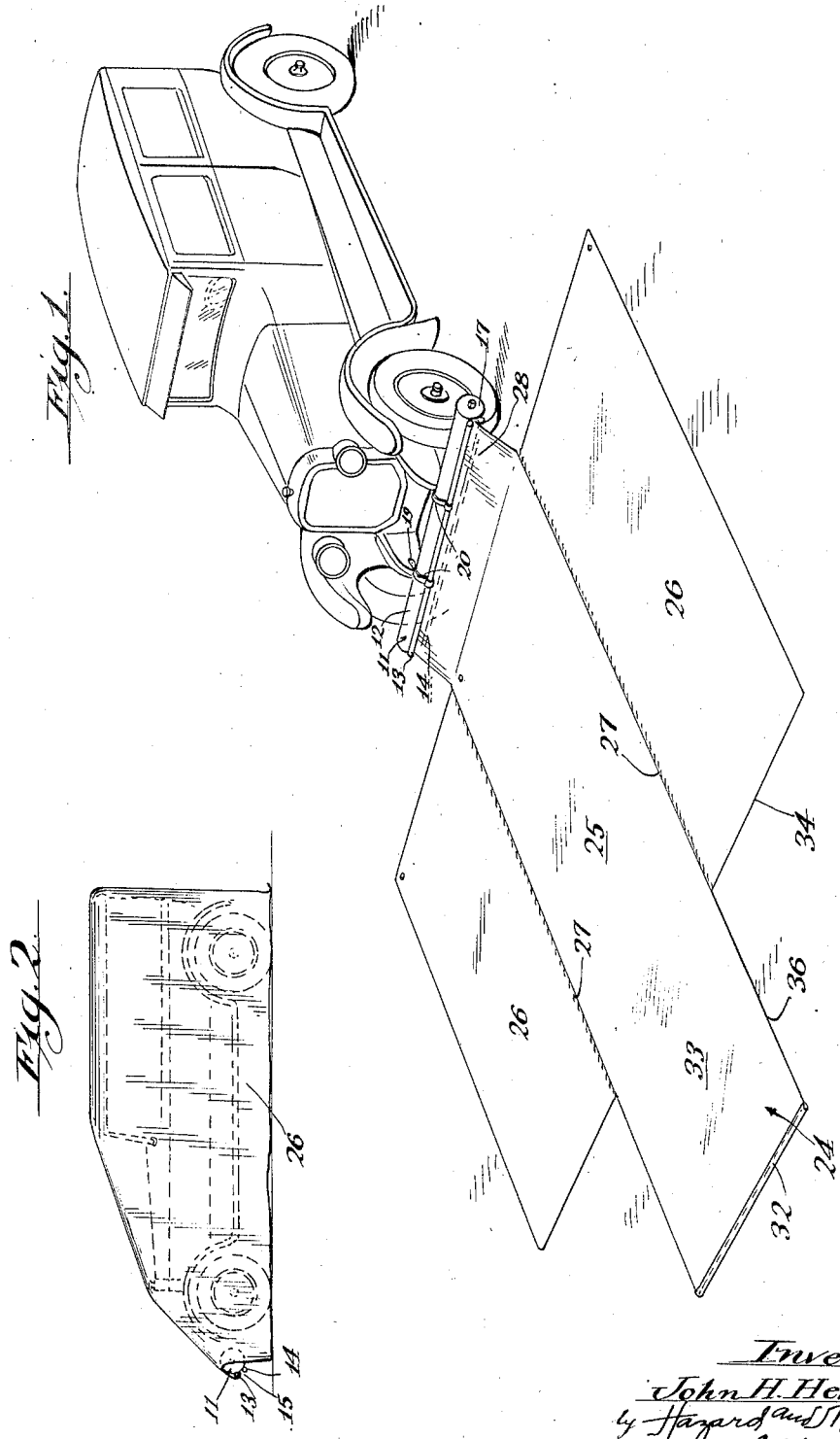
Inventor:
John H. Herzer,
by Hazard and Miller
Attorneys.

July 2, 1929.  J. H. HERZER  1,719,055
COMBINATION BUMPER, CONTAINER, TENT, AND CAR COVER
Filed April 20, 1927   2 Sheets-Sheet 2
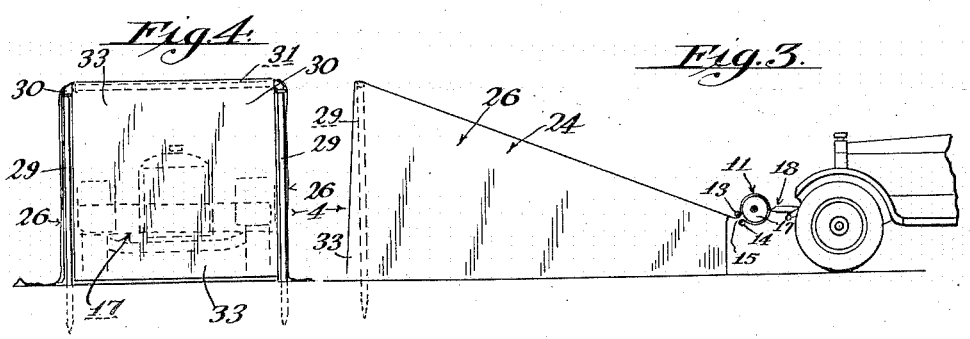
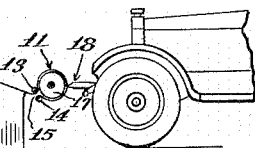
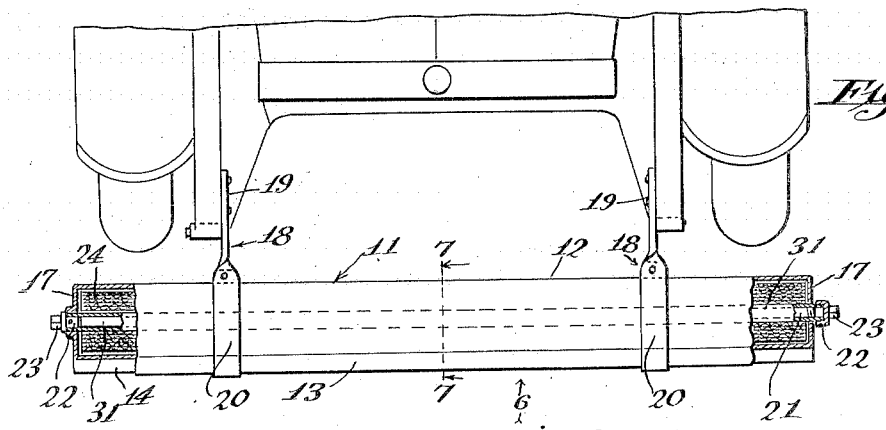
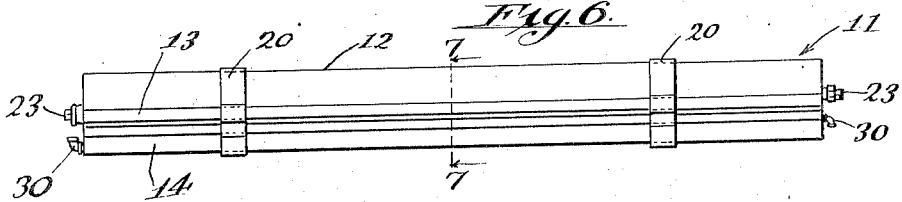
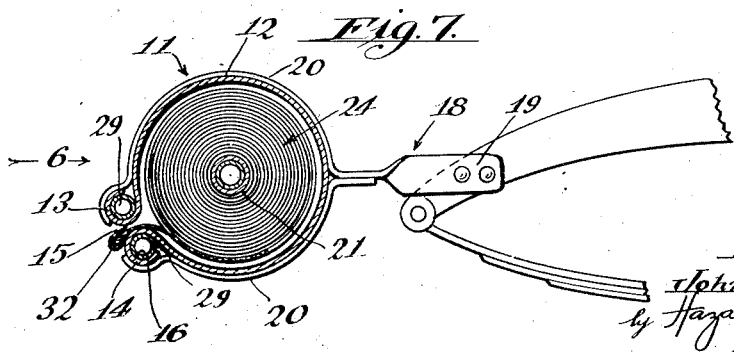

Patented July 2, 1929.

1,719,055

UNITED STATES PATENT OFFICE.

JOHN H. HERZER, OF LOS ANGELES, CALIFORNIA.

COMBINATION BUMPER, CONTAINER, TENT, AND CAR COVER.

Application filed April 20, 1927. Serial No. 185,216.

My invention is a combination bumper, container, tent and car cover, in which the container for a tent may be utilized as an automobile bumper, and the tent may be utilized as a car cover.

An object of my invention is the construction of a tent of such character that it may be housed in a cylindrical type of container, and this container may be readily attached to the front or the back of an automobile forming a bumper. The fabric structure forming the tent may, if desired, be drawn over the automobile and form a cover for same.

A more specific object of my invention is the formation of a tent structure with a central web to form a roof structure, and with side portions to form the tent walls, the side portions being foldable over the central web, and the whole device thus folded is mounted on a roller or bar centrally positioned in a cylindrical container so that the fabric structure may be rolled on the roller and housed in the container. This container has brackets connected thereto which may attach to the front or the back of an automobile and thus the container with the tent drawn in functions as a bumper.

When the device is used as a tent it is drawn out of the container and the central web or roof part passed over a ridge bar and the two side elements drop down forming walls or side curtains, the ridge pole being supported by posts or the like.

When the fabric structure is used as an automobile cover, this large sheet of fabric is pulled out of the container and the sides unfolded from over the web part and the whole device is drawn over the top of the automobile, leaving one end still attached to the drum in the container, in which case the web or the roof part of the tent passes over the top of the car and the side parts forming the tent walls drape downwardly over the sides of the car forming curtains. The structure may be of sufficient length to completely cover the ordinary automobile.

My invention in its various aspects is illustrated in the accompanying drawings, in which:

Figure 1 shows in perspective an automobile with my invention attached thereto, the canvas or equivalent fabric being spread out flat in front of the automobile.

Figure 2 is a side elevation showing an automobile with my device used as a car cover.

Figure 3 is a side elevation of part of a car showing my invention utilized as a tent.

Figure 4 is an end elevation of a tent as if taken in the direction of the arrow 4 of Fig. 3.

Figure 5 is a plan view of the container, showing its attachment to an automobile, the container being shown partly in section.

Figure 6 is a front elevation of the container taken in the direction of the arrow 6 of Figs. 5 or 7.

Figure 7 is a transverse section of the container with the tent rolled therein, taken on the line 7—7 of Figs. 5 and 6, in the direction of the arrows.

The container part of my invention is substantially as follows, such container being designated generally by the numeral 11. This comprises a substantially cylindrical part 12 which has upper and lower curled edges 13 and 14 with an open space 15 between them, these edges forming longitudinal curled beads 16. The flat or disc like ends 17 are secured to the cylindrical structure, being rigid therewith. Brackets 18 have an end 19 which may be secured to an automobile structure and these brackets have curved arms 20 or the like which partly encircle the container and are riveted or otherwise secured thereto so that the container is held rigid with the brackets and may be supported either on the front or the back of an automobile.

A roller 21, illustrated in the form of a pipe, is journaled in the discs 17 and this has a plug 22 at each end with preferably a squared nut 23 on the plug, or the plug may be formed in any suitable manner so that it may be gripped by a crank type of wrench for a purpose hereunder set forth.

The tent or cover structure, designated generally by the numeral 24, has a central web 25 and lateral side pieces 26. The web may be made of one width of material, and in which case the side parts may be secured thereto by stitching 27. The web has an inner end portion 28 which is secured in any suitable manner to the roller 21.

To support the tent I have two posts 29, preferably formed of pipe, with elbows 30 secured to one end, and a ridge pipe 31. The posts 29 are preferably housed in the curled beads 16 formed by the curled edges 13 and 14 of the metal of the container. These curled beads are of such size that the pipes forming the posts have a tight fit and padding or packing is utilized to prevent rattle. One of the plugs 22 is preferably removable and allows inserting of the ridge pipe 31 inside of the roller 21 so that when the plug is reinserted the ridge bar is carried in a convenient position.

The manner of using and functioning of my invention is substantially as follows:

Presuming the fabric structure for use as a tent or to cover an automobile is spread out on the ground in front of the vehicle, as shown in Fig. 1, if it is desired to house this in the container, the side portions or flaps 26 are folded neatly over the web, one flap overlapping the other, and is thus rectangular in shape. Then by turning the roller 21 by means of a suitable crank or other wrench like instrument, the fabric may be wound on the roller until it is completely drawn into the drum except for a bead 32 on the end of the web part of the fabric, the fabric being drawn into the container through the open part 15 between the two ends. Then with the posts 29 secured in the curled beads 16 and the ridge bar 31 in the roller 21, the automobile is free to travel in the usual manner and the container with the canvas therein being secured to either the front or the rear of the vehicle forms a bumper.

If it is desired to utilize my invention as a tent, the posts 29 may be withdrawn from the curled beads 16, the ridge bar also being withdrawn from the roller by removing the plug at one end, and these parts are coupled together, the posts being driven into the ground, as shown in Figs. 3 and 4. The canvas may then be drawn out of the container by pulling on the bead 32 or the projecting part until the web 25 is drawn over the ridge bar. It may then drape down over this bar and may be secured to same by tapes or other fastenings if desired or allowed to fit loosely thereover. The portion extending beyond the posts and ridge bar may be staked to the ground or have ropes secured to pegs driven in the ground. It will thus be seen that I form a tent which has an end adjacent the automobile which is secured to the container and at this end a curtain may be dropped if desired. The web 25 forms a roof structure and the side elements 26 side walls. Thus a simple form of tent may be quickly and readily made by utilizing the canvas rolled in the container with the supporting posts which may be readily carried also thereon. It is manifest that additional posts and ridge bars may be carried on the vehicle to give a tent of different shape and that the side parts 26 may be so shaped as to give the desired type of side walls when a tent is formed.

If it is desired to use my invention to cover a vehicle, the canvas may be drawn out of the container, as above described, but instead of pulling same forwardly of the car, as shown in Fig. 1, or over the post and ridge bar construction for the tent, the web with the folded side parts may be drawn backwardly over the hood and the top of the vehicle until the web drapes over the rear of the car. The side parts 26 may then be pulled out from underneath the web and draped downwardly over the sides of the car, giving sufficient protection and forming an adequate cover.

It is obvious from the above description that the canvas forming the structure for the tent or the vehicle cover may be shaped to form a desirable vehicle cover for different shapes of vehicles and that it is immaterial whether this forms a snug fit or drapes loosely at the sides and the back, and when a tent structure is formed it is also immaterial if part of the side elements 26 drape on the ground or not. It will thus be seen that I have developed a tent structure which may also be used as a vehicle cover, which may be quickly drawn out from a container and quickly replaced therein. I have in addition provided a convenient arrangement for carrying the container and the tent structure and this functions as a bumper and may be, as above mentioned, either on the front or rear of the vehicle.

It will be noted that the sides 26 are not as long as the web and that this web may be considered as having an extension part 33 with the bead 32 in the end. This extension end may hang down over the ridge bar and if desired be secured to the end edges 34 of the side strips by joining the edge of the extension, indicated by the numeral 36.

Various changes may be made in the principles of my invention without departing from the spirit thereof, as set forth in the description, drawings and claims.

I claim:

1. In the art described the combination of a substantially cylindrical container having a longitudinal opening with disc like ends, means to secure the container to the front or the rear of the vehicle, a roller journaled in the said ends, a fabric structure having a central web portion with side elements foldable over the web portion, one end of the web portion being connected to the roller, the roller being rotatable to roll the fabric structure thereon into the container through the longitudinal opening, and the fabric structure when withdrawn from the container being adapted to be used in forming a tent with the web portion forming the roof and the side portions forming the walls.

2. In the art described, the combination of a container, means to secure said container on one end of a vehicle, a fabric structure having a central web and lateral side pieces foldable over the web, and means to roll the central web and the side pieces as folded in the container, the central web when extended being adapted to extend over the top of a vehicle and the side pieces to drape downwardly over the sides of the vehicle.

3. In the art described, as claimed in claim 2, tent posts and a ridge bar, said bar being adapted to engage the central web and allow an end of the web to drape thereover, the lateral side pieces forming part of the tent and the end of the web being attached to the said container.

4. In the art described, the combination of a container, means to attach same to one end of a vehicle, said container having a longitudinal opening and a roller journaled in said container, a fabric structure having a central web secured to the roller and having lateral side pieces secured to the edge of the web, the said web projecting beyond the side pieces, the web being adapted to form a cover over the top of an automobile with the end draping over the back or to be supported by a ridge pole with the end draping thereover to form part of a tent, the side pieces being adapted to drape over the sides of a vehicle or to form the sides of the tent, one end of the web being always secured to the said roller.

5. In the art described, the combination of a container having a longitudinal opening, hollow curled beads adjacent said opening, a hollow roller journaled in the container, the curled beads and the roller adapted to have tent poles and ridge bar stored therein, means to secure the container to a vehicle, a fabric structure for a tent or cover having one end secured to the roller, the roller being rotatable to reel the fabric structure in and out of the container, the fabric structure when withdrawn together with the posts and assembled ridge bar forming a tent.

6. In the art described, the combination of a substantially cylindrical container having a longitudinal opening with hollow curled beads formed adjacent the opening, disc like ends on the container, a hollow roller journaled in said ends, means to secure the container to a vehicle, posts and a ridge bar adapted to be secured in the curled beads and the hollow roller, a fabric structure having a central web with one end connected to the roller, and side elements foldable over the web, the roller being rotatable for reeling the folded fabric structure thereon to house same in the container, the fabric structure when withdrawn with the posts and assembled ridge bar formable into a tent with one end connected to the roller, the central web extending over the ridge bar and the side elements draping downwardly.

In testimony whereof I have signed my name to this specification.

J. H. HERZER.